(No Model.) 3 Sheets—Sheet 1.

M. SETTLE.
SAFETY LAMP FOR USE IN MINES AND OTHER PLACES.

No. 361,455. Patented Apr. 19, 1887.

Witnesses:
Aley. Barkoff
William D. Couner

Inventor:
Miles Settle
by his Attorneys
Howson and Sons (No Model.) 3 Sheets—Sheet 2.

M. SETTLE.
SAFETY LAMP FOR USE IN MINES AND OTHER PLACES.

No. 361,455. Patented Apr. 19, 1887.

Witnesses:
Alex. Barkoff
William D. Conner.

Inventor:
Miles Settle
by his Attorneys
Howson and Son (No Model.) 3 Sheets—Sheet 3.
M. SETTLE.
SAFETY LAMP FOR USE IN MINES AND OTHER PLACES.
No. 361,455. Patented Apr. 19, 1887.
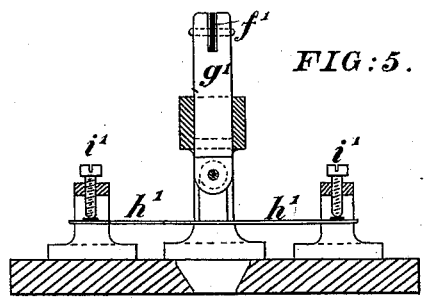
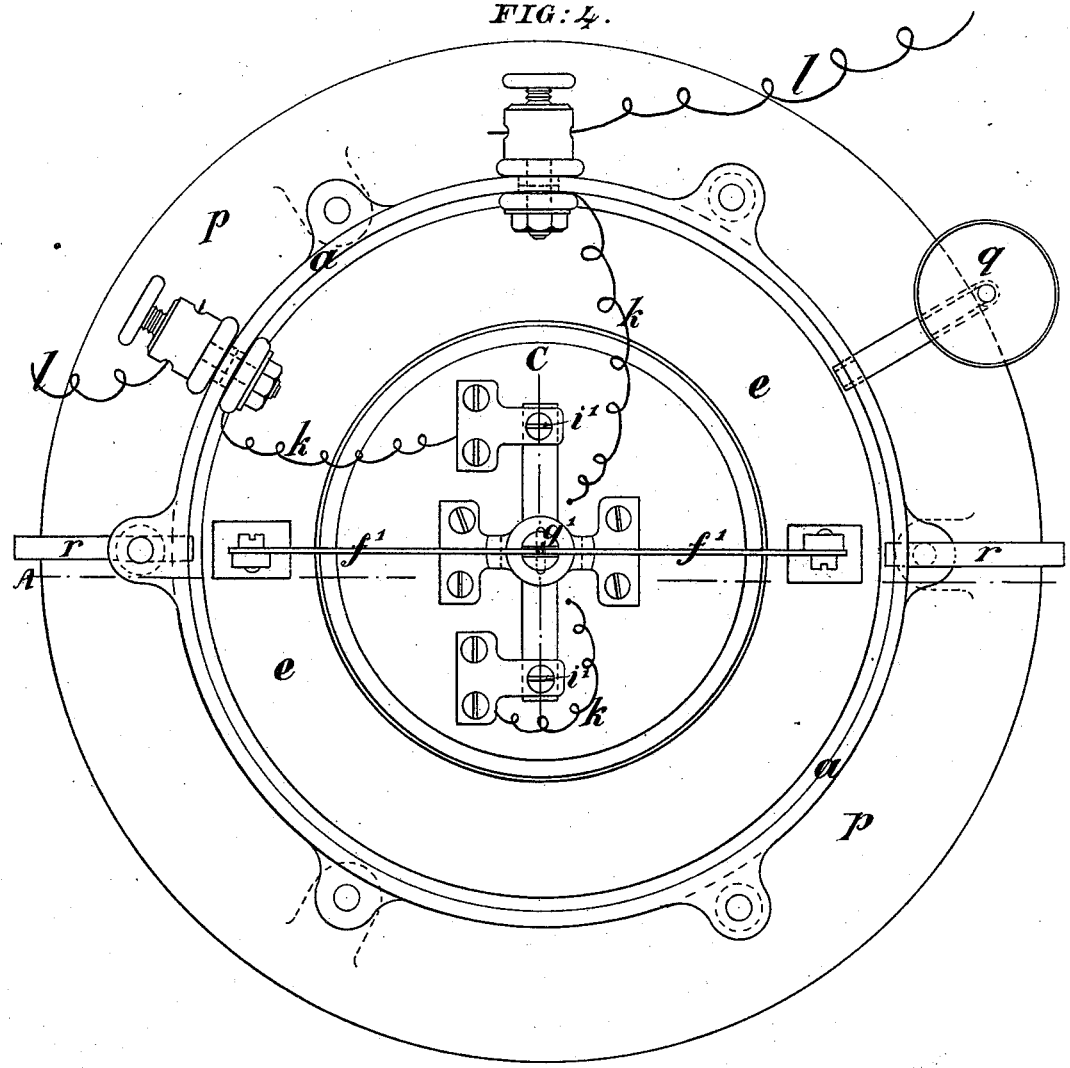
Witnesses:
Aley. Barkoff
William D. Conner.
Inventor:
Miles Settle
by his Attorneys
Howson and Son

UNITED STATES PATENT OFFICE.

MILES SETTLE, OF SNOW HILL, DARCY LEVER, NEAR BOLTON, COUNTY OF LANCASTER, ENGLAND.

SAFETY-LAMP FOR USE IN MINES AND OTHER PLACES.

SPECIFICATION forming part of Letters Patent No. 361,455, dated April 19, 1887.

Application filed September 8, 1886. Serial No. 213,010. (No model.) Patented in England July 1, 1886, No. 8,608, and in Belgium October 27, 1886, No. 75,004.

*To all whom it may concern:*

Be it known that I, MILES SETTLE, a subject of the Queen of Great Britain, and residing at Snow Hill, Darcy Lever, near Bolton, in the county of Lancaster, England, have invented an Improved Electric Safety-Lamp for Use in Mines and other Places, (for which I have obtained British Patent No. 8,608, dated July 1, 1886, and Belgian Patent No. 75,004, dated October 27, 1886,) of which the following is a specification.

My invention relates to the construction of that class of electric safety-lamps for use in mines wherein the lamp is entirely surrounded by water, the object of the said invention being to cause the lamp to be instantly and infallibly extinguished whenever the outer glass is broken or (from leakage or any other cause) the water escapes from the outer casing.

The nature of my invention and the manner in which the same is to be put into practical operation will be readily understood on reference to the three sheets of drawings hereunto annexed and the following explanation thereof.

Figure 1:
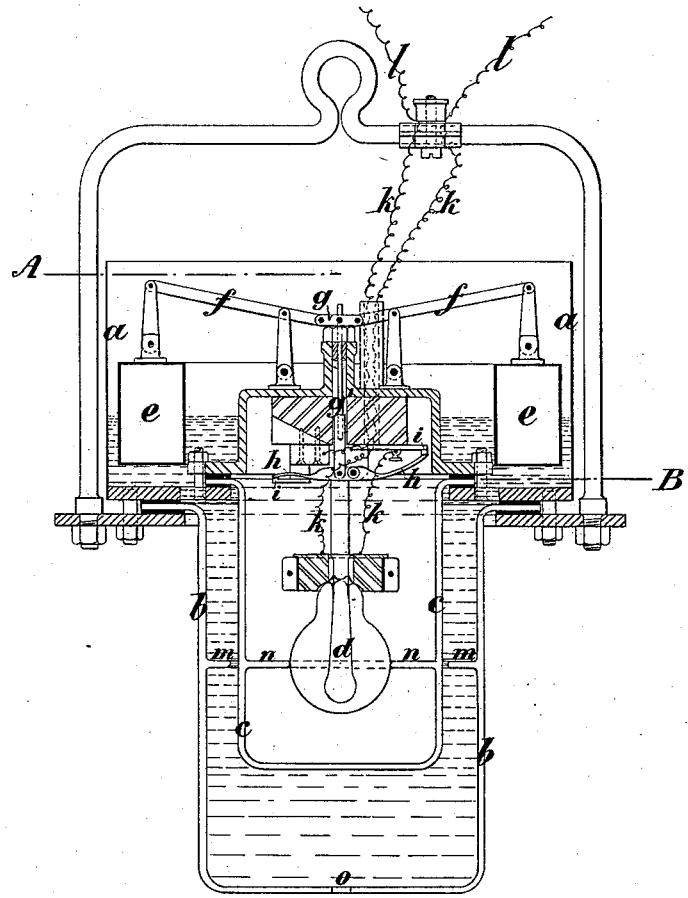
Figure 2:
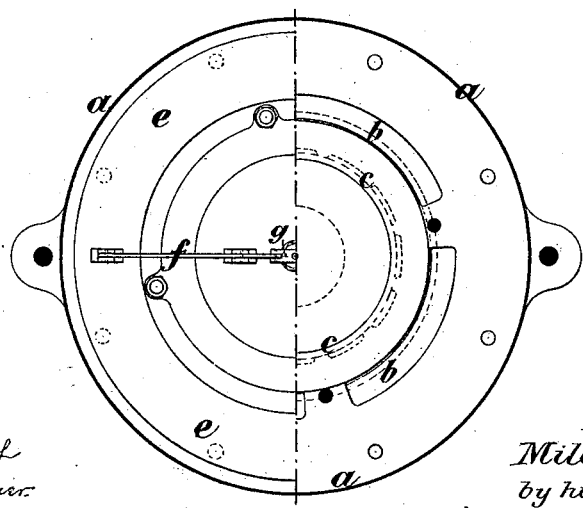
Figure 3:
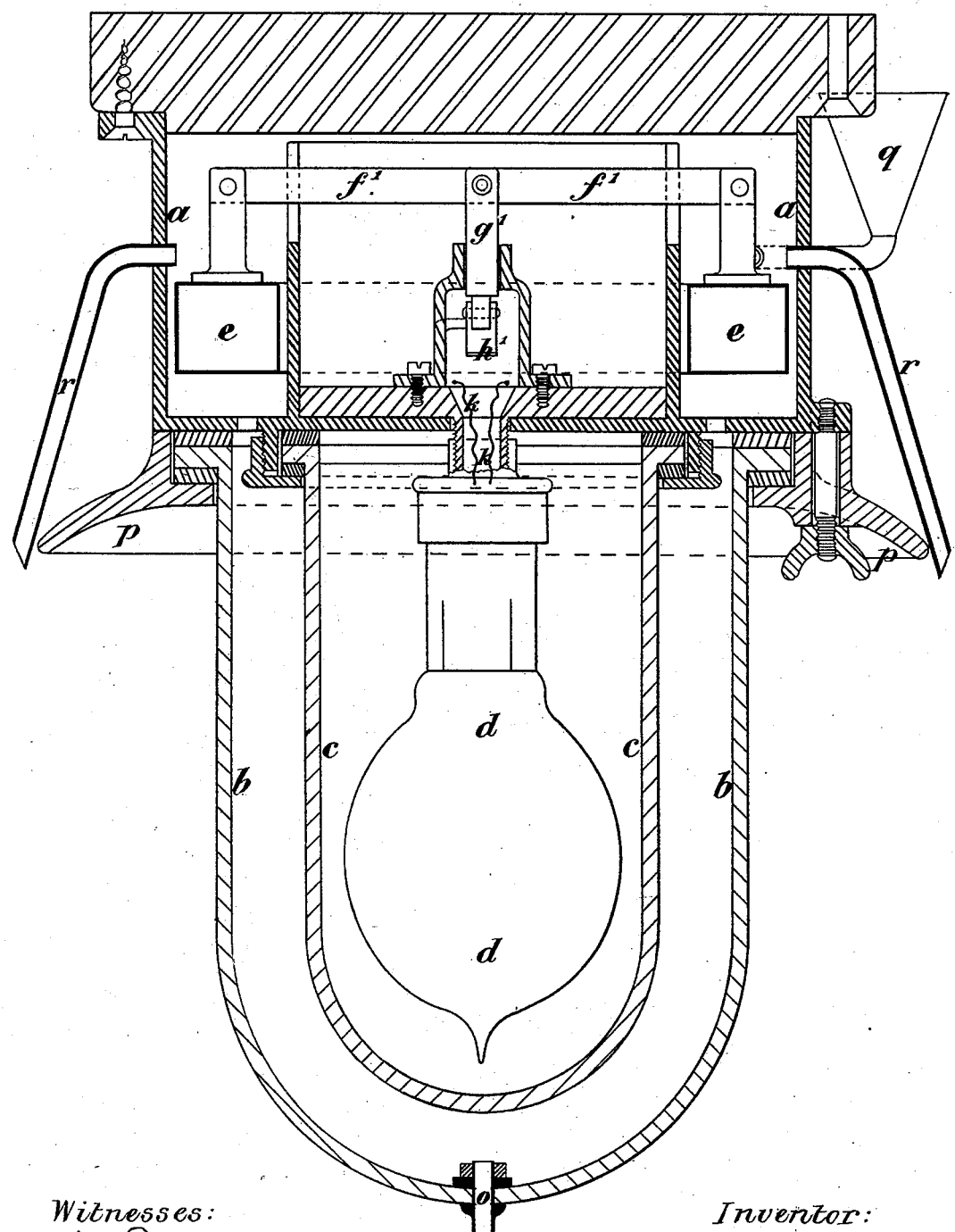

On Sheet 1 of the drawings, Figure 1 is a vertical section through the center of an electric safety-lamp constructed according to my invention; and Fig. 2 is a half-and-half horizontal section of the same, following the line A B in Fig. 1. On Sheets 2 and 3 of the drawings, Fig. 3 is a vertical section through the line A B on Fig. 4, which is a plan or horizontal section of a modification of this improved safety-lamp; and Fig. 5 is a detached sectional view through C D, Fig. 4, of the contact-breaking mechanism thereof.

I employ a vessel or reservoir, $a$ $a$, containing water, which water also fills the space between the outer and inner glass casings, $b$ $b$ and $c$ $c$, surrounding the "Swan" or other electric lamp $d$ $d$. In this reservoir $a$ $a$, I place a float, $e$ $e$, (preferably of hollow metal,) and to this float I attach a lever or levers, $f f$, the inner ends of which are connected by a link, $g g$, and connecting-rod, $g'$, to a contact-lever, $h h$, provided with platinum points acting against two contact-pieces, $i i$, which are in electric connection by means of the wires $k k$ with the lamp $d d$ and the line-wires $l l$. It will be seen on reference to the drawings that this connection is made in such a manner that so long as the water remains in the vessel or reservoir $a a$, and the float $e e$ is thereby sustained at its proper level, the communication between the connecting-wires is kept constant and the lamp $d d$ continues burning; but if, owing to the breakage of the outer glass, $b b$, or from leakage or other cause, the level of the water in the reservoir $a a$ falls below its normal position, the float $e e$ falls with it, and, by means of the levers $ff$, link $g g$, connecting-rod $g' g'$, and contact-lever $h h$, breaks the contact or communication between the conducting-wires, and the lamp $d d$ becomes immediately extinguished.

As a further safeguard, and in order to prevent the possibility of danger from "sparking" on the breakage of the outer glass casing, $b b$, I sometimes provide the same with an inner flange, $m m$, touching the inner glass casing, $c c$, and I provide the latter also with a similar flange, $n n$, touching the globe of the lamp $d d$; and it will be evident that in the event of the outer glass, $b b$, becoming broken (either accidentally or otherwise) these flanges $m$ and $n$ will cause the simultaneous breakage of the intermediate glass, $c c$, and of the globe $d d$ of the lamp also, with which they are in contact, and the water immediately enters and cools the incandescent wire or carbon or other substance, and effectually extinguishes any spark that may by any possibility be present.

The flanges $m m$ and $n n$ are by preference made of glass; but a metal flange or pegs, ribs, or other projections may be employed for this purpose, so long as they are in such absolute contact with both glasses that it would not be possible to break the outer glass without at the same time breaking the intermediate glass and the globe of the lamp.

Sheets 2 and 3, as before mentioned, show a modification of my improved safety-lamp.

The principal parts are marked with the same letters of reference as on Sheet 1, the chief difference being that instead of the levers $ff$, I have a cross-bar, $f' f'$, which rises and falls with the float $e e$, and is connected by a link, $g' g'$, to a contact-breaker, $h' h'$, provided with platinum points acting against the two contact-screws $i' i'$, forming the communication between the line-wires $l\ l$ and the wires $k\ k$ of the lamp. I provide an opening, $o$, in the outer glass, $b$, to be fitted with a tap for emptying the water when it becomes discolored or otherwise contaminated. A reflector, $p\ p$, may also be applied to the lamp; also, a suitable funnel, $q$, for filling the glass casing with water, and overflow-pipes $r\ r$, for allowing surplus water to escape.

In a modified form of this lamp I propose to dispense with the intermediate glass, $c\ c$, in which case the water will fill the space between the outer glass casing and the globe of the lamp, and there will only require to be one flange or equivalent device to cause the fracture of the outer glass to break the globe of the lamp also.

The electric contact-breaking arrangement will be the same as in the previously-described cases.

I claim—

1. The combination of an electric lamp with a safety water-vessel containing the lamp, a contact-breaker for the lamp-wires, and a float in the water-vessel connected to and adapted to operate the contact-breaker, substantially as set forth.

2. The combination of an electric lamp with a safety water-vessel containing the lamp, a contact-breaker for the lamp-wires, a float in the water-vessel, and a lever or bar and link connecting the float with the contact-breaker, substantially as specified.

3. The combination of an electric lamp with a safety water-vessel containing the lamp and having an inner flange or projections in contact with the lamp-globe, as and for the purpose described.

4. The combination of an electric lamp with a water-vessel, $a$, and glass casings $b$ and $c$, one within the other, a contact-breaker, and an operating-float for the latter, substantially as set forth.

In testimony whereof I have signed my name to this specification in the presence of two subscribing witnesses.

MILES SETTLE.

Witnesses:
GEORGE DAVIES,
JNO. HUGHES.